United States Patent
Hart et al.

(10) Patent No.: US 10,286,451 B2
(45) Date of Patent: May 14, 2019

(54) BUILD PLATE FOR ADDITIVE MANUFACTURING SYSTEMS

(71) Applicant: General Electric Company, Schenectady, NY (US)

(72) Inventors: Kassy Moy Hart, Greenville, SC (US); Chad Joseph Dulkiewicz, Simpsonville, SC (US); Archie Lee Swanner, Jr., Easley, SC (US); Russell Dwayne Yates, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 15/341,441

(22) Filed: Nov. 2, 2016

(65) Prior Publication Data

US 2018/0117854 A1     May 3, 2018

(51) Int. Cl.
| | |
|---|---|
| *B29C 64/153* | (2017.01) |
| *B29C 64/20* | (2017.01) |
| *B33Y 30/00* | (2015.01) |
| *B22F 3/105* | (2006.01) |

(52) U.S. Cl.
CPC .......... *B22F 3/1055* (2013.01); *B29C 64/153* (2017.08); *B29C 64/20* (2017.08); *B22F 2003/1056* (2013.01); *B22F 2207/20* (2013.01); *B22F 2999/00* (2013.01); *B33Y 30/00* (2014.12); *Y02P 10/295* (2015.11)

(58) Field of Classification Search
CPC combination set(s) only.
See application file for complete search history.

(56) References Cited

U.S. PATENT DOCUMENTS

| | | | |
|---|---|---|---|
| 6,042,774 A | 3/2000 | Wilkening et al. | |
| 6,483,596 B1* | 11/2002 | Philippi | G05B 19/4015 |
| | | | 156/272.8 |
| 8,994,592 B2* | 3/2015 | Scott | B22F 3/1055 |
| | | | 343/700 MS |
| 2008/0217818 A1* | 9/2008 | Holmboe | B33Y 30/00 |
| | | | 264/401 |
| 2011/0168347 A1* | 7/2011 | Knerr | B22D 17/2236 |
| | | | 164/131 |
| 2011/0293771 A1 | 12/2011 | Oberhofer et al. | |
| 2014/0302187 A1 | 10/2014 | Pawlikowski et al. | |
| 2015/0056321 A1 | 2/2015 | Zhang et al. | |
| 2015/0360287 A1* | 12/2015 | Zink | B22F 3/1055 |
| | | | 419/28 |
| 2016/0021982 A1* | 1/2016 | Davis | A43D 5/02 |
| | | | 29/559 |
| 2016/0031010 A1* | 2/2016 | O'Neill | B22F 3/1055 |
| | | | 419/28 |
| 2016/0064839 A1* | 3/2016 | Goodman | H01R 12/91 |
| | | | 439/65 |
| 2016/0144428 A1* | 5/2016 | Mironets | B23K 26/342 |
| | | | 419/7 |

(Continued)

*Primary Examiner* — Jacob T Minskey
*Assistant Examiner* — Baileigh Kate Darnell
(74) *Attorney, Agent, or Firm* — Ernest G. Cusick; Hoffman Warnick LLC (57) ABSTRACT

Various embodiments include a build plate for additive manufacturing, along with a related system. The build plate may include: a first build surface having at least one recess therein; and at least one block configured to matingly engage with, and disengage with, the at least one recess, the block including a second build surface.

18 Claims, 6 Drawing Sheets

(56) References Cited

U.S. PATENT DOCUMENTS

2016/0175932 A1* 6/2016 Dimter ................. B22F 3/1055
                                                        419/28
2017/0256848 A1* 9/2017 McGrath .................. H01Q 5/30
2018/0086004 A1* 3/2018 Van Espen ............. B33Y 40/00

* cited by examiner

BUILD PLATE FOR ADDITIVE MANUFACTURING SYSTEMS

FIELD

The disclosure relates generally to materials for additive manufacturing techniques, or more specifically, to a build plate including recesses and blocks utilized by an additive manufacturing system to build components.

BACKGROUND

The development of additive manufacturing, also known in the art as "3D printing," can reduce manufacturing costs by allowing components to be formed more quickly, with unit-to-unit variations as appropriate, through direct application of computer-generated models and with less expensive equipment and/or raw materials. Additive manufacturing can include producing a component through layering of material rather than the removal of material. Additive manufacturing can allow a component to be formed from a reserve of fine metal powder positioned on a build plate, which is processed by an electron beam or laser (e.g., using heat treatments such as sintering) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process.

Direct Metal Laser Melting (DMLM) and Selective Laser Melting (SLM) are additive manufacturing technologies capable of being used to build parts with complex geometries, e.g., airfoil components for installation in a turbomachine such as an aircraft engine or power generation system, however without requiring the tooling techniques common with non-additive manufacturing techniques. DMLM frequently uses 3D CAD data in a digital format combined with an energy source, typically a high-power laser in order to create three-dimensional metal or alloy parts by fusing together particles of metallic powders or powders of alloys.

Conventional additive manufacturing systems build these components on large, solid, build plates. These conventional build plates are often made of two inches of solid metal, for example, stainless steel. Aside from being heavy, cumbersome and expensive to initially manufacture, additional costs are typically associated with the use of conventional build plates by the additive manufacturing systems. For example, after a component is built on and removed from the conventional build plate, the build plate must undergo additional processing. Specifically, the build plate may be machined (e.g., resurfaced, planed, milled and the like) before being utilized again by the additive manufacturing system to build another component. The required machining after every component build is expensive and typically requires the build plate to be sent away, which can affect the production time of components when only one or few build plates are accessible to be used by the additive manufacturing system. Additionally, every time the build plate is machined, the operational life of the build plate is decreased, and the build plate will eventually need to be replaced.

Further, conventional build plates include raised partitions to divvy the build plate area for multiple material powders and may include integrated leaf spring systems to engagement with a retainer plate. Where multiple components are manufactured on a single build plate according to one of these configurations, it becomes difficult to access an individual component, for example, if that component is in the center of the build plate.

BRIEF DESCRIPTION

Embodiments of the disclosure disclosed herein may include a build plate for an additive manufacturing system. The build plate may include: a first build surface having at least one recess therein; and at least one block configured to matingly engage with, and disengage with, the at least one recess, the at least one block including a second build surface.

Embodiments of the disclosure may also include an additive manufacturing system. The additive manufacturing system may include: a build plate attached to a base, the build plate including: a first build surface having at least one recess therein; and at least one block configured to matingly engage with, and disengage with, the at least one recess, the at least one block including a second build surface; and an additive manufacturing printer configured to execute a code that includes computer-executable instructions defining a component to physically generate an object on the build plate.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figures 1, 2, 3:
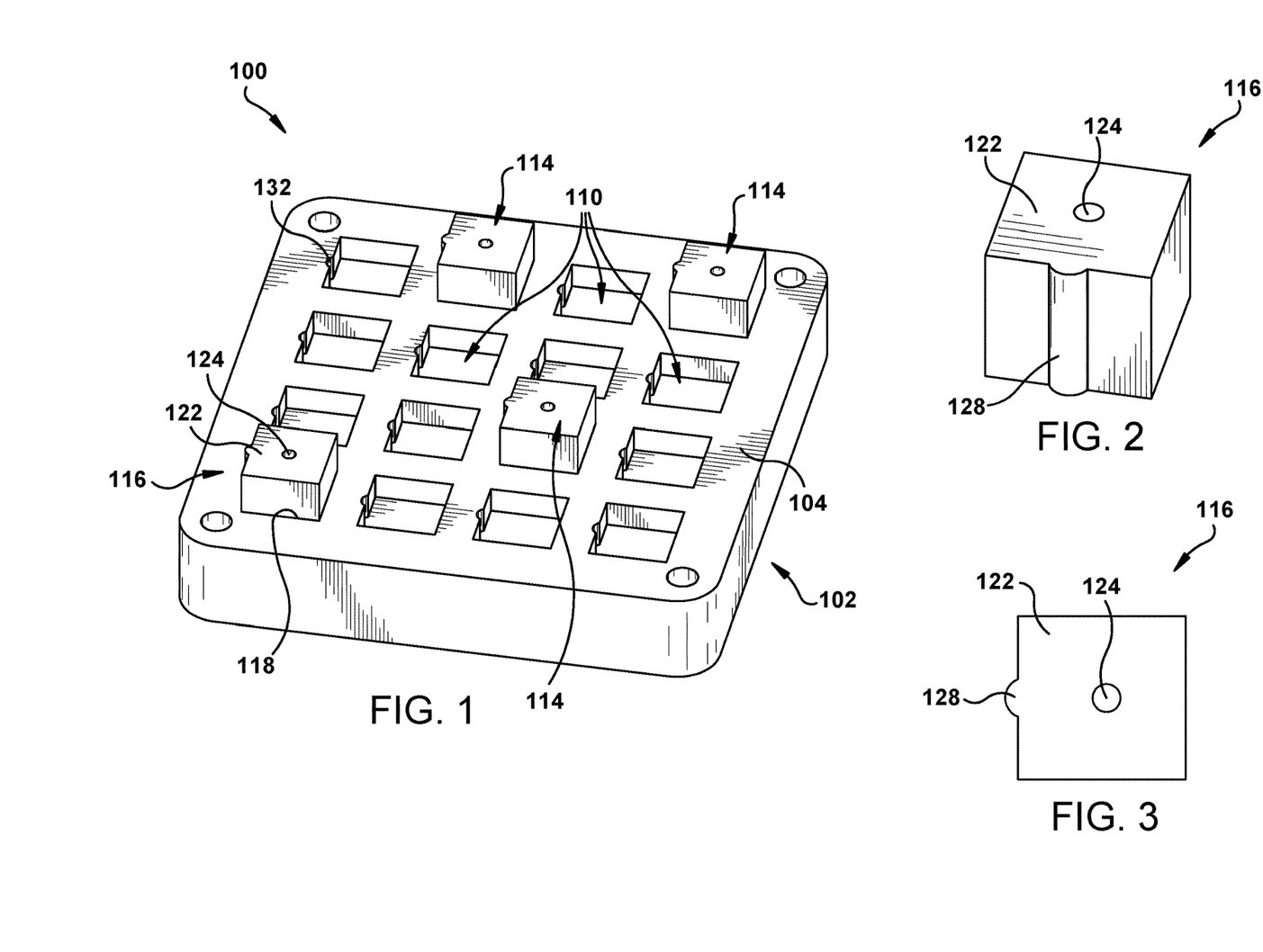
FIG. 1 shows a three-dimensional perspective view of a build plate for an additive manufacturing system according to embodiments of the disclosure.
FIG. 2 shows a three-dimensional perspective view of a block for a build plate according to embodiments of the disclosure.
FIG. 3 shows a top-down view of the block shown in FIG. 2.

Embodiments of the present disclosure include a build plate for an additive manufacturing system. Referring to FIG. 1, a build plate 100 for an additive manufacturing system 900 (FIG. 10) according to one embodiment is shown. Build plate 100 may include a base plate 102 composed of solid metal, such as stainless steel. Base plate 102 may be of any dimension and/or thickness depending upon the desired object 902 (FIG. 10) to be built thereon. In some embodiments, base plate 102 may be the same size as the machine build platform (not shown), and can be secured to the platform using bolts. Base plate 102 may include a first build surface 104 having a least one recess 110 therein. For example, as shown in FIG. 1, base plate 102 may include a plurality of spaced apart recesses 110. Recesses 110 may be formed at least partially through an entire thickness of base plate 102. In some embodiments (not shown in FIG. 1), recesses 110 may be formed through an entire thickness of base plate 102. Recesses 110 may be formed in base plate 102 using any suitable material removal process including, but not limited to, milling, grinding, cutting, blasting and the like.

Figure 10:
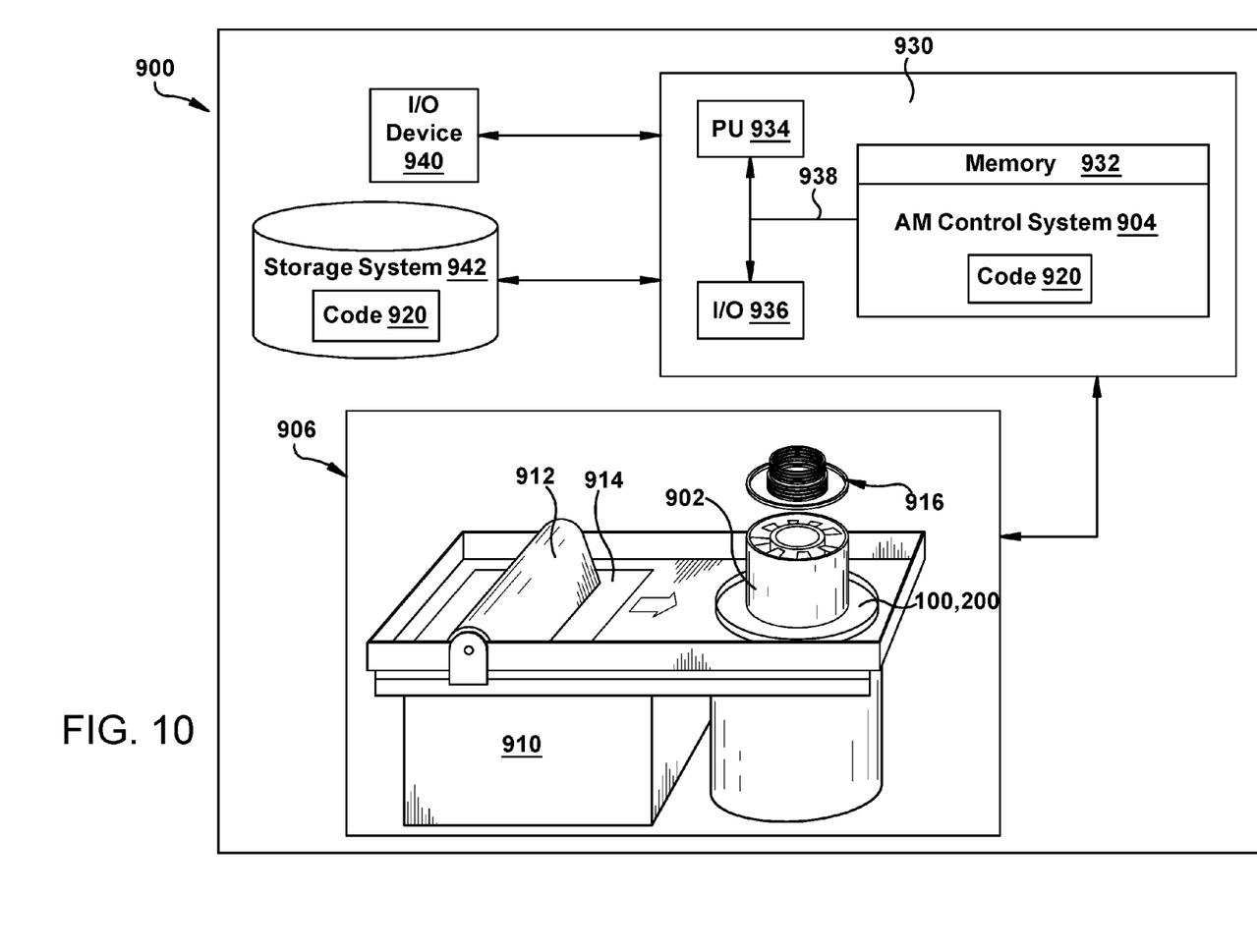
FIG. 10 shows a block diagram of an additive manufacturing system and process including a non-transitory computer readable storage medium storing code representative of an components generated by additive manufacturing system, according to embodiments of the disclosure.

Build plate 100 may also include at least one block 114 sized to or configured to matingly engage, releasably couple, and/or be retained within at least one recess in the plurality of recesses 110. As used herein, "block" may refer to any freestanding piece of material, and may include a chunk, hunk, lump, wedge, cube, brick, slab, bar, etc. In some embodiments (shown), build plate 100 may include a plurality of blocks 114 wherein each block 114 is configured to matingly engage with a respective recess in the plurality of recesses 110 such that blocks 114 are removable from recesses 110 and/or can be disengaged from recesses 110. For example, block 116 in the plurality of blocks 114 is configured to matingly engage with recess 118 of the plurality of recesses 110. In some embodiments, blocks 114 may be composed of a material that is the same as a material used for a raw material 914 (FIG. 10), e.g., powder, used in additive manufacturing system 900 (FIG. 10). However, in other embodiments, blocks 114 may be composed of a material that is distinct from a material that is used for raw material 914 used in additive manufacturing system 900. In another embodiment, blocks 114 can be composed of the same material as base plate 102, e.g., stainless steel. While blocks 114 are shown as being substantially rectangular in shape, blocks 114 may be of any shape without departing from aspects of the disclosure described herein. Additionally, the blocks within the plurality of block 114 may each have a dimension that is distinct from another block in the plurality of blocks 114. That is, a first block and a second block in the plurality of blocks 114 may differ from one another in length, width, depth, shape, and/or volume. As used herein, "substantially" refers to largely, for the most part, entirely specified or any slight deviation which provides the same technical benefits of the invention.

At this time, the relationship of blocks 114 and recesses 110 will be explained referring to a single block 116 and a single recess 118. However, it is to be understood that the description relating to block 116 and recess 118 is equally applicable to each block in the plurality of blocks 114 and each recess in the plurality of recesses 110. FIG. 2 shows a three-dimensional view of block 116. FIG. 3 shows a top-down perspective view of block 116. Referring to FIGS. 1-3 together, block 116 may have a build surface 122. When block 116 is matingly engaged with recess 118 (FIG. 1), build surface 122 may be raised with respect to build surface 104 (FIG. 1) of base plate 102 (FIG. 1). That is, build surface 122 may be vertically offset from build surface 104 such that build surface 122 is at a height greater than build surface 104. In some embodiments, block 116 may contact a bottom surface of recess 118. However, in other embodiments, block 116 may not contact the bottom surface of recess 118, but rather, may be held within recess by thermal expansion of block 116 within recess 118.

An object 902 (FIG. 10) which is desired to be built by additive manufacturing system 900 (FIG. 10) may be built directly on build surface 122 of block 116. In some embodiments, block 116 may also include at least one hole, aperture, opening, orifice, cavity, space, etc., hereinafter "hole" 124 extending entirely or partially therethrough. Hole 124 may facilitate the removal of raw material 914 (FIG. 10) used in additive manufacturing system 900. Additionally, the shape of hole 124 may be customized based on the shape of block 116 and/or object 902 to be built on build surface 122. It is to be understood that any number of holes can be employed within block 116.

Further, block 116 may include a projection 128 for matingly engaging with a groove 132 within a recess 118. Projection 128 may be formed such that projection 128 runs vertically along a side of block 116 such that projection 128 extends from a bottom surface of recess 118 to build surface 122 of block 116. Groove 132 (FIG. 1) may be formed within base plate 102 (FIG. 1) such that groove 132 extends vertically from build surface 104 to a bottom surface of recess 118 (FIG. 1). Projection 128 may extend along a sidewall of block 116 such that projection 128 extends in a direction that is perpendicular to build surface 122 of block 116. Further, groove 132 may extend along a sidewall of recess 118 such that groove 132 extends in a direction that is perpendicular to build surface 104 of base plate 102. This projection-groove configuration of block 116 and recess 118 relies on the thermal expansion of block 116 and base plate 102 to secure block 116 within recess 118. That is, in a cooled state, block 116 may be matingly engaged, releasable coupled, inserted, pushed, placed, loaded, dropped, and/or slid within recess 118. Then, as the additive manufacturing process begins, block 116 and base plate 102 become heated causing expansion of block 116 and base plate 102 such that block 116 is retained and/or secured within recess 110 of base plate 102. Additionally, after the additive manufacturing process is complete, block 116 and base plate 102 may cool and block 116 may be unengaged, uncoupled, removed, pulled, lifted, and/or unloaded from recess 118.

Referring now to the plurality of blocks 114 (FIG. 1), each block 116 in the plurality of blocks 114 may be configured to matingly engage, and be removable from, with a respective recess in the plurality of recesses 110 (FIG. 1). That is, each block in the plurality of blocks 114 may include a projection 128 while each recess in the plurality of recesses 110 may include a groove 132. While build plate 100 has been shown such that blocks 114 each include a projection 128, and recesses 110 each include a groove 132, it is to be understood that blocks 114 could each include a groove while recesses 110 each include a projection in other embodiments. Further, it is to be understood that any other means (slots, tracks, apertures, protrusions, juts, jags, etc.) for matingly engaging blocks 114 and recesses 110 may be employed without departing from aspects of the disclosure. Blocks 114 including holes 124 and projections 128 (and/or grooves) may be formed by conventional techniques such as milling, grinding, cutting, blasting and the like.

The block-recess configuration of build plate 100 allows for customization of blocks 114 to facilitate a desired configuration of object 902 (FIG. 10) to be built on build plate 100 by additive manufacturing system 900 (FIG. 10). That is, each block-recess configuration may be of a shape distinct from another block-recess configuration within the same build plate, e.g., build plate 100, thereby allowing a distinct object to be built thereon. Further, block-recess configurations can be of distinct sizes. However, in any embodiment, build surfaces 122 of each block 114 can be in substantially planar alignment, substantially level, and/or substantially even with one another. Additionally, it is to be understood that any number of blocks 114 and any number of recesses 110 may be employed within build plate 100 without departing from the disclosure. The block-recess configuration also allows removal and manipulation of each individual block having the completed object thereon without affecting the remaining blocks including objects of their own thereon. Further, the block-recess configuration of build plate 100 allows for easy cleaning of build plate 100 as blocks 114 can be individually removed and cleaned or machined as needed.

Figure 4:
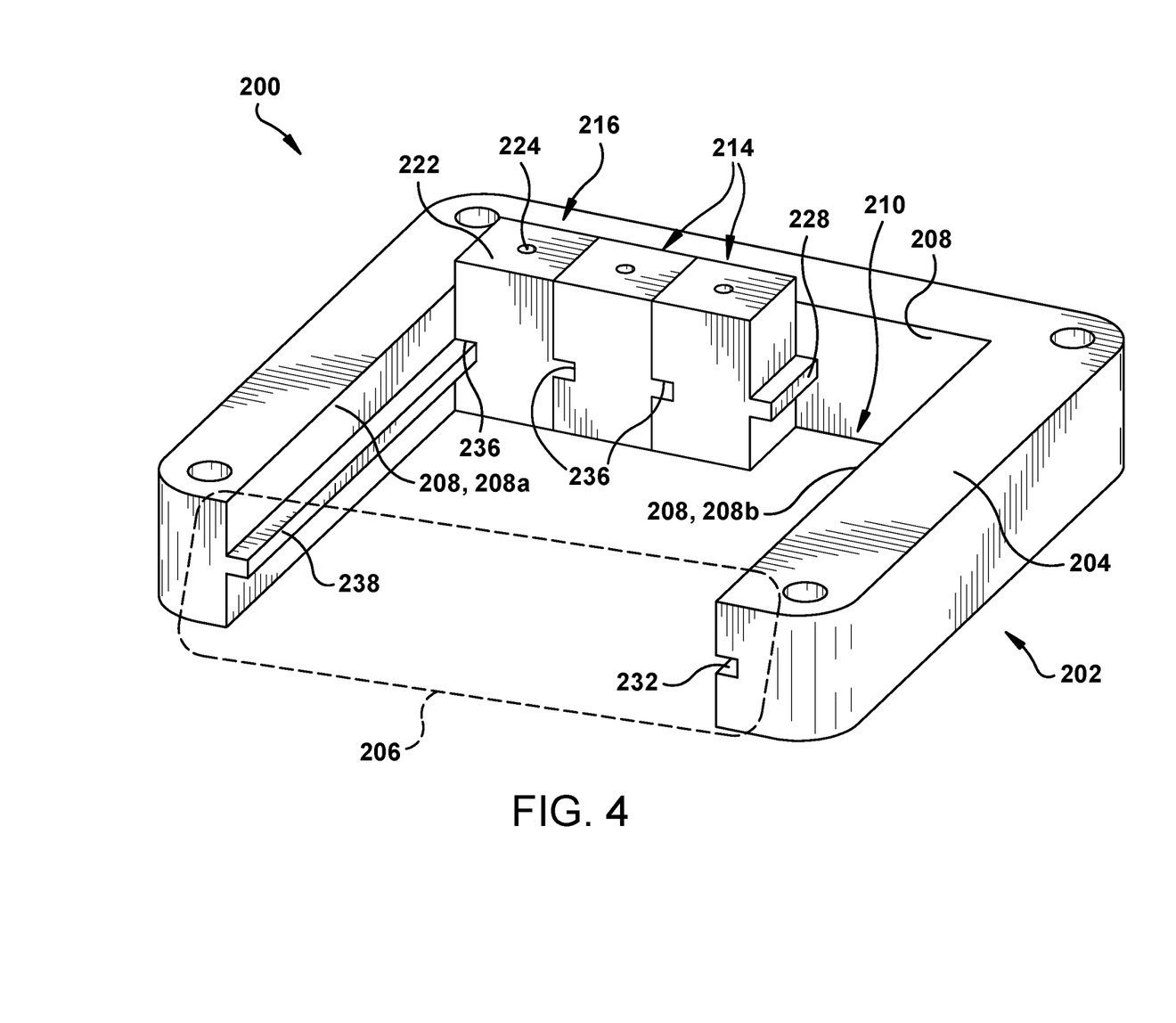
FIGS. 4 and 5 show three-dimensional perspective views of a build plate for an additive manufacturing system according to embodiments of the disclosure.
Figure 5:
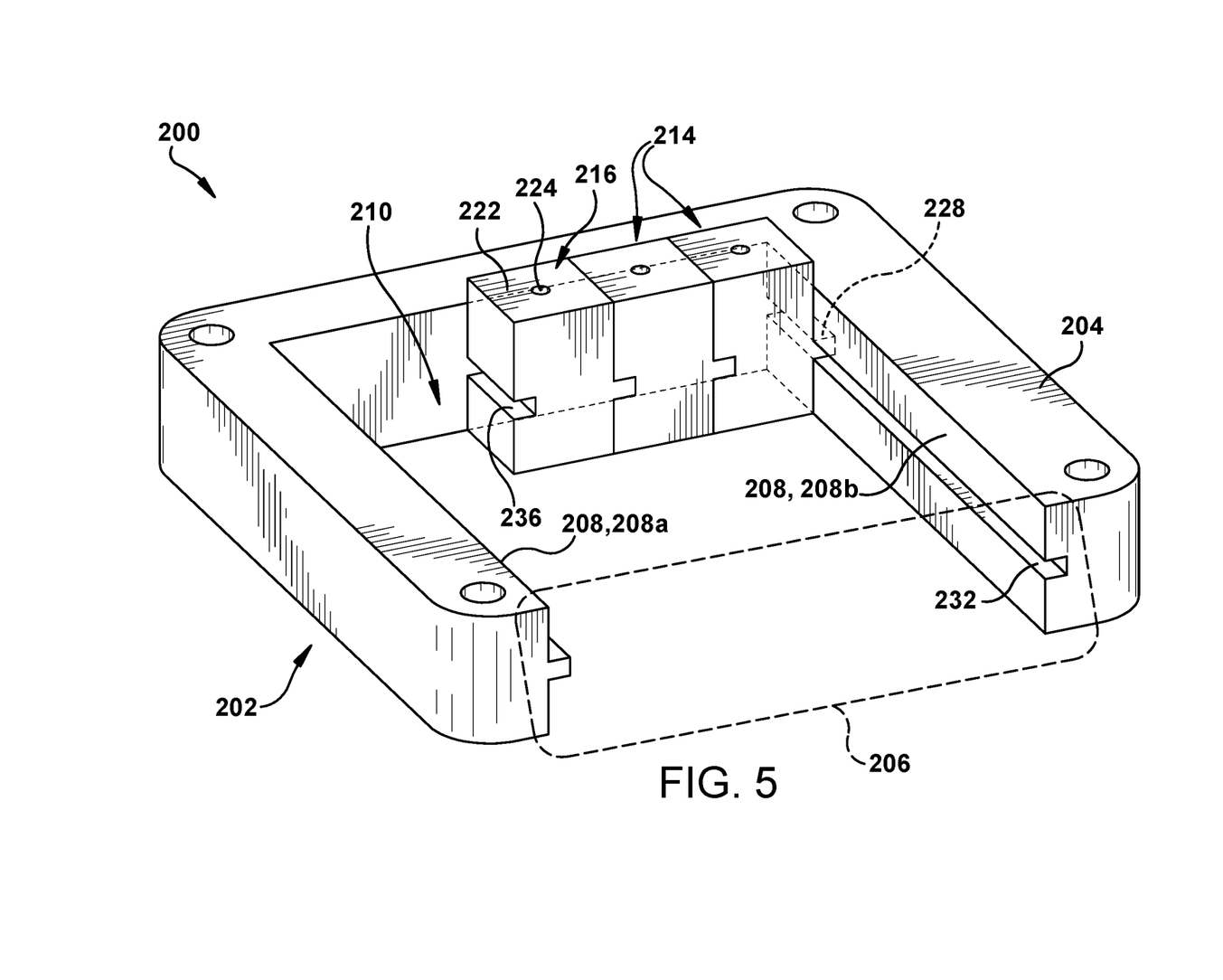

FIGS. 4-5 show a build plate configuration according to another embodiment of the disclosure. FIG. 4 shows a three-dimensional view of a build plate 200 along one sidewall according to this embodiment. FIG. 5 shows a three-dimensional view of build plate 200 of FIG. 4 along the opposing sidewall according to this embodiment. Referring to FIGS. 4-5 together, build plate 200 may include a base plate 202 composed of solid metal, such as stainless steel. Base plate 202 may include a first build surface 204 having a least one recess 210 therein. For example, as shown in FIG. 4, base plate 202 may include a single recess 210 extending through an entire thickness of base plate 202. Additionally, recess 210 may be formed such that at least one sidewall 206 (represented by dotted box) of base plate 202 is removed. Therefore, recess 210 may be defined within base plate 202 by remaining sidewalls 208. Recess 210 may be formed in base plate 202 using any suitable material removal process including, but not limited to, milling, grinding, cutting, blasting and the like.

Build plate 200 may also include at least one block configured to matingly engage with recess 210. In some embodiments (shown), build plate 200 may include a plurality of blocks 214 which are configured to matingly engage with at least one sidewall 208 of recess 210 and/or with adjacent blocks 214 within recess 210 such that recess 210 is completely filled with the plurality of blocks 214. In some embodiments, blocks 214 may be composed of a material that is the same as a material used for a raw material 914 (FIG. 10), e.g., powder, used in additive manufacturing system 900 (FIG. 10). However, in other embodiments, blocks 214 may be composed of a material that is distinct from a material that is used for raw material 914 used in additive manufacturing system 900. In yet another embodiment, blocks 214 can be composed of the same material as base plate 202, e.g., stainless steel. While blocks 214 are shown as being substantially rectangular in shape, blocks 214 may be of any shape without departing from aspects of the disclosure described herein.

Figures 6, 7, 8:
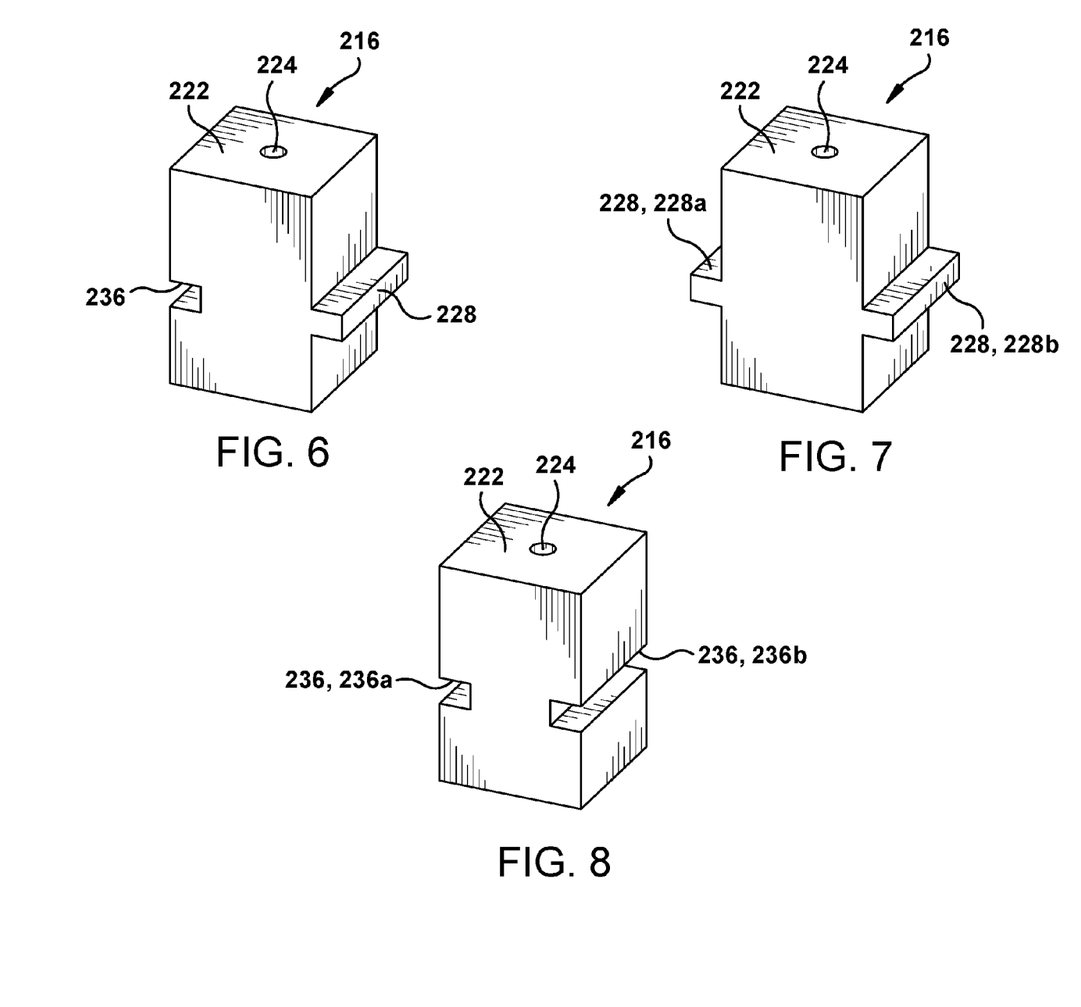
FIGS. 6-8 show examples of blocks for a build plate according to embodiments of the disclosure.

FIG. 6 shows a three-dimensional view of a single block 216. Referring to FIGS. 4-6 together, block 216 may have a build surface 222. Build surface 222 may be raised with respect to build surface 204 (FIGS. 4-5) of base plate 202 (FIGS. 4-5). That is, build surface 222 may be vertically offset from build surface 204 such that build surface 222 is at a height greater than build surface 204. An object 902 (FIG. 10) which is desired to be built by additive manufacturing system 900 (FIG. 10) may be built directly on build surface 222 of blocks 214. Block 216 may also include at least one hole 224 extending therethrough. Hole 224 may facilitate the removal of raw material 914 (FIG. 10) used for the additive manufacturing system. Additionally, the shape of hole 224 may be customized based on the shape of block 216 and/or the object 902 to be built on build surface 222.

Further, block 216 may include a projection 228 for matingly engaging with a groove 232 along a sidewall 208, e.g., sidewall 208b, within recess 210 (FIGS. 4-5). Block 216 may also include a groove 236 on a side of block 216 that is opposite projection 228. Groove 236 may be configured to matingly engage with a projection 238 on another sidewall 208, e.g., 208a that is opposite from sidewall 208 that includes groove 232, e.g., sidewall 208b. Projection 228 and groove 236 may extend along a sidewall of block 216 such that projection 228 and groove 236 each extend in a direction that is parallel to build surface 222 of block 216. Further, groove 232 and projection 238 may each extend along a sidewall of recess 210 such that groove 232 and projection 238 each extend in a direction that is parallel to build surface 204 of base plate 202. This projection-groove configuration relies on the thermal expansion of blocks 214 and base plate 202 to secure blocks 214 within recesses 210. That is, in a cooled state, block 216 may easily be matingly engaged, releasable coupled, inserted, pushed, placed, loaded, dropped, and/or slid within recess 210. Then, as the additive manufacturing process begins, block 216 and base plate 202 (FIGS. 4-5) become heated causing expansion of block 216 and base plate 202 such that block 216 is retained and/or secured within recess 210 of base plate 202. Additionally, after the additive manufacturing process is complete, and block 216 and base plate 202 may cool, and block 216 may be easily unengaged, uncoupled, removed, pulled, lifted, and/or unloaded from recess 210. However, referring now to plurality of blocks 214 (FIGS. 4-5), in order to remove blocks 214, blocks 214 that are nearest to removed sidewall 206 (FIGS. 4-5) must be removed prior to blocks 216 farthest from removed sidewall 206. In this manner, blocks 214 nearest removed sidewall 206 can be individually removed to access blocks 214 moving away from removed sidewall 206 or closer to the center of recess 210.

While build plate 200 has been shown such that blocks 214 each include a projection 228 and a groove 236 for matingly engaging a groove 232 and a projection 238 within base plate 202, respectively, other configurations are contemplated by the disclosure. For example, FIG. 7 shows an embodiment where block 216 includes two projections 228, such that one projection 228a is on a side of block 216 that is opposite the other projection 228b. In this embodiment, it should be understood that projections 228a, 228b are each configured to matingly engage with a groove of base plate 202 (FIGS. 4-5) and/or a groove of an adjacent block in the plurality of blocks 214 (FIGS. 4-5). FIG. 8 shows an embodiment where block 216 includes two grooves 236, such that one groove 236a is on a side of block 216 that is opposite the other groove 236b. In this embodiment, it should be understood that grooves 236a, 236b are each configured to matingly engage with a projection (not shown) of base plate 202 (FIGS. 4-5) and/or a projection of an adjacent block in the plurality of blocks 214 (FIG. 4-5). Additionally, it is also contemplated that base plate 202 (FIGS. 4-5) may include two projections on opposing sidewalls 208 and/or two grooves on opposing sidewalls 208. Further, it is to be understood that any other means (slots, tracks, etc.) for matingly engaging blocks 214 and recess 210 (FIGS. 4-5) may be employed without departing from aspects of the disclosure. Blocks 214 including holes 224, projections 228, and/or grooves 236 may be formed by conventional techniques such as milling, grinding, cutting, blasting and the like.

Figure 9:
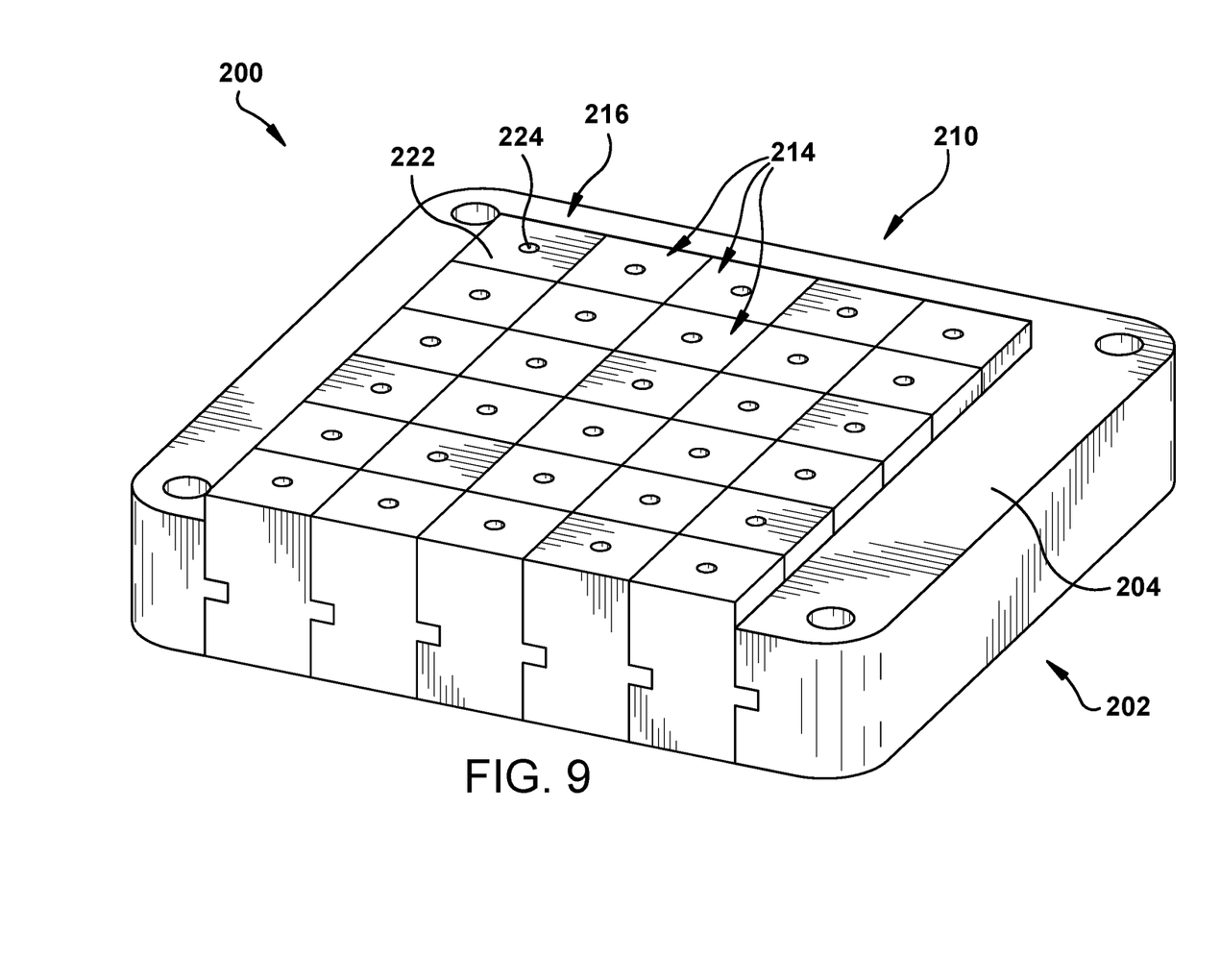
FIG. 9 shows the build plate according to FIG. 4, where the recess is completely filled in with blocks.

FIG. 9 shows an example of the embodiment of FIG. 4 wherein recess 210 is completely filled in with blocks 214. The block-recess configuration of build plate 200 allows for customization of blocks 214 to facilitate a desired configuration of an object to be built on build plate 200. However, in any embodiment, build surfaces 222 of each block 214 should be in substantially planar alignment, substantially level, and/or substantially even with one another. Additionally, it is to be understood that any number of blocks 214 may be employed within recess 210 of build plate 200 within departing from the disclosure. The block-recess configuration also allows removal and manipulation of each individual block having the completed object thereon without affecting the remaining blocks. Further, the block-recess configuration of build plate 200 allows for easy cleaning and maintenance of build plate 200 as blocks 214 can be individually removed and cleaned or machined as needed.

To illustrate an example additive manufacturing process, FIG. 10 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture any component on build plates 100, 200, as discussed herein. Additive manufacturing system 900 generally includes a computerized additive manufacturing (AM) control system 904 and an additive manufacturing (AM) printer 906. Additive manufacturing system 900, as will be described, executes code 920 that includes a set of computer-executable instructions defining a component(s) to physically generate the object using additive manufacturing printer 906. Each additive manufacturing process may use different raw materials in the form of, for example, fine-grain powder, liquid (e.g., polymers), sheet, etc., a stock of which may be held in a chamber 910 of additive manufacturing printer 906. In the instant case, the component(s) may be made of stainless steel or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer or where a metal binder jetting process is used. In the example shown, a laser or electron beam 916 fuses particles for each slice, as defined by code 920. Various parts of additive manufacturing printer 906 may move to accommodate the addition of each new layer, e.g., a build plate 100, 200 may lower and/or chamber 910 and/or applicator 912 may rise after each layer.

Additive manufacturing control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as additive manufacturing control system 904, that is stored in memory 932 and/or storage system 942 under instructions from code 920 representative of component(s) to be built on build plate 100, 200, as described herein. While executing computer program code, processor 934 can read and/or write data to/from memory 932, storage system 942, I/O device 940 and/or additive manufacturing printer 906. Bus 938 provides a communication link between each of the components in computer 930, and I/O device 940 can comprise any device that enables a user to interact with computer 930 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of one or more component(s), discussed herein as being built on build plate(s) of additive manufacturing system 900. As noted, code 920 includes a set of computer-executable instructions defining component(s) that can be used to physically generate the tip, upon execution of the code by system 900. For example, code 920 may include a precisely defined 3D model of component(s) and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing component(s) build on build plate 100, 200 into a series of thin slices that it assembles using AM printer 906 in successive layers of liquid, powder, sheet or other material. In the DMLM example, each layer is melted to the exact geometry defined by code 920 and fused to the preceding layer. Subsequently, the component(s) may be exposed to any variety of finishing processes, e.g., minor machining, sealing, polishing, assembly to parts or components, etc.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A build plate for an additive manufacturing system, the build plate comprising:
   a first build surface having at least one recess therein, wherein a sidewall of the at least one recess includes a first connecting member extending from a bottom surface of the at least one recess to the first build surface along the sidewall of the at least one recess in a direction perpendicular to the first build surface; and
   at least one block configured to matingly engage with, and disengage with, the at least one recess, the at least one block including a second build surface, wherein a sidewall of the at least one block includes a second, complementary connecting member extending from a bottom surface of the at least one block along the sidewall of the at least one block to the second build surface in a direction perpendicular to the second build surface, the first connecting member and the second, complementary connecting member comprising a projection and groove configuration,
   wherein, when the at least one block is inserted into the at least one recess, the bottom surface of the at least one block contacts the bottom surface of the at least one recess.

2. The build plate of claim 1, wherein the second build surface is raised with respect to the first build surface when the at least one block is inserted into the at least one recess.

3. The build plate of claim 1, wherein the at least one block includes a hole extending therethrough from the bottom surface of the at least one block to the second build surface.

4. The build plate of claim 1, wherein the at least one block is composed of a material that is distinct from a material of a powder used in the additive manufacturing system.

5. The build plate of claim 1, wherein the at least one block is composed of a material that is the same as a material of a powder used in the additive manufacturing system.

6. The build plate of claim 1, wherein the at least one recess includes a plurality of spaced recesses, and
   wherein the at least one block includes a plurality of blocks, each block of the plurality of blocks configured to matingly engage with a respective recess of the plurality of spaced recesses.

7. The build plate of claim 1, wherein the at least one recess extends through an entire thickness of the build plate.

8. The build plate of claim 7, wherein the at least one block includes a plurality of blocks.

9. The build plate of claim 1, wherein the at least one block includes a plurality of blocks, and wherein a first block in the plurality of blocks has a dimension that is distinct from a second block in the plurality of blocks.

10. An additive manufacturing system comprising:
    a build plate attached to a base, the build plate including:
       a first build surface having at least one recess therein, wherein a sidewall of the at least one recess includes a first connecting member extending from a bottom surface of the at least one recess to the first build surface along the sidewall of the at least one recess in a direction perpendicular to the first build surface; and
       at least one block configured to matingly engage with, and disengage with, at least one recess, the at least one block including a second build surface, wherein a sidewall of the at least one block includes a second, complementary connecting member extending from a bottom surface of the at least one block along the sidewall of the at least one block to the second build surface in a direction perpendicular to the second build surface, the first connecting member and the second, complementary connecting member comprising a projection and groove configuration wherein when the at least one block is inserted into the at least one recess, and wherein the bottom surface of the at least one block contacts the bottom surface of the at least one recess; and
    an additive manufacturing printer configured to execute code that includes computer-executable instructions defining a component to physically generate an object on the build plate.

11. The additive manufacturing system of claim 10, wherein the second build surface is raised with respect to the first build surface when the at least one block is inserted into the at least one recess.

12. The additive manufacturing system of claim 10, wherein the at least one block includes a hole extending therethrough from the bottom surface of the at least one block to the second build surface.

13. The additive manufacturing system of claim 10, wherein the at least one block is composed of a material that is distinct from a material of a powder used in the additive manufacturing system.

14. The additive manufacturing system of claim 10, wherein the at least one block is composed of a material that is the same as a material of a powder used in the additive manufacturing system.

15. The additive manufacturing system of claim 10, wherein the at least one recess includes a plurality of spaced recesses, and
    wherein the at least one block includes a plurality of blocks, each block of the plurality of blocks configured to matingly engage with a respective recess of the plurality of spaced recesses.

16. The additive manufacturing system of claim 10, wherein the at least one recess extends through an entire thickness of the build plate.

17. The additive manufacturing system of claim 16, wherein the at least one block includes a plurality of blocks.

18. The build plate of claim 10, wherein the at least one block includes a plurality of blocks, and wherein a first block in the plurality of blocks has a dimension that is distinct from a second block in the plurality of blocks.

* * * * *